March 25, 1924.

I. J. CUNDIFF

RIVET SET

Filed Dec. 31, 1919

1,488,230

Witness:
R. L. Farrington

Inventor,
Isaac J. Cundiff,
By Brown & Nissen
Attys

Patented Mar. 25, 1924.

1,488,230

UNITED STATES PATENT OFFICE.

ISAAC J. CUNDIFF, OF CHICAGO, ILLINOIS.

RIVET SET.

Application filed December 31, 1919. Serial No. 348,690.

*To all whom it may concern:*

Be it known that I, ISAAC J. CUNDIFF, a citizen of the United States, residing at Chicago, in the county of Cook and State of Illinois, have invented certain new and useful Improvements in Rivet Sets, of which the following is a specification.

My invention relates to rivet sets and has for one of its objects the provision of a device, of the kind described, arranged so as to give long life thereto.

A further object is the provision of a rivet set comprising a head and a shank removably attached together in a manner to prevent easily breaking the rivet set.

Other objects will appear hereinafter.

An embodiment of my invention is shown in the accompanying drawing forming a part of this specification and in which—

Figure 1:
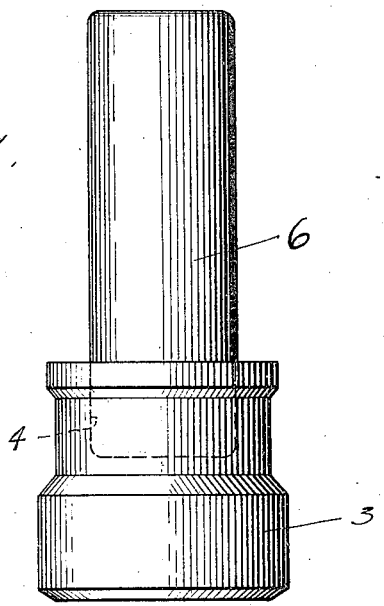
Fig. 1 is a side view of a rivet set embodying my invention.
Figure 2:
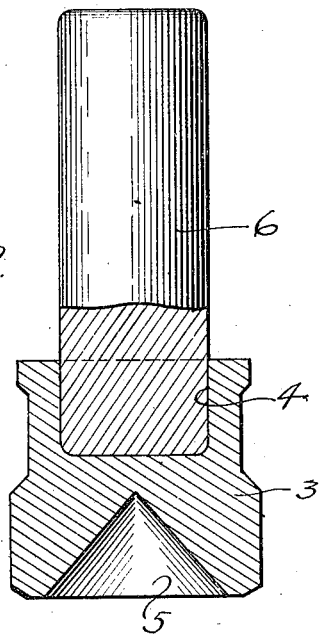
Fig. 2 is a partial vertical section of the same.

In rivet sets such as I have indicated in the drawing and which is adaptable for use in power riveting machines, the shank is ordinarily made integral with the head and due to the hardening of the material of the set quite often breaks. A workman sometimes breaks as high as forty or fifty sets in a day. By providing a set made with the shank and head separable in the manner I have indicated reduces this breaking of the devices to a minimum.

Referring more particularly to the drawing, I have indicated a head 3 having a recess 4 in its upper side. A recess 5 is formed in the lower side of the head 3 in any desirable shape so as to give the finished rivet head a desirable shape.

The recess 4 may be formed in any desirable shape in cross-section, the shape I have indicated being cylindrical, as this shape works to good advantage. In the recess 4 I provide the lower end of a shank 6. The form of shank shown is cylindrical but it will be understood that the lower end of such shank should be made to fit the cross-section of the recess 4 in whatever form the latter is provided. The bottom of said recess 4 is preferably plane as indicated in the drawing and the corners between the cylindrical wall and bottom is rounded or curved so as to eliminate sharp corners. These rounded corners also have a tendency to cause the lower end of the stem 6 to be squeezed inwardly or compressed and therefore prevents said lower end from flattening or spreading under the hammering action of the tool with which the device is to be used.

The upper end of shank 6, while it is shown cylindrical, should be formed to fit the tool or other machine in which it is to be used, such machine or tool not being shown.

In use the shank 6 is clamped in the machine or tool operating the rivet set in the usual manner and the shank 6 provided so that the head 3 may slide easily on to and off of said shank and preferably so that the head may revolve around the shank in use. The fit between the lower end of shank 6 and recess 4 is preferably a snug sliding fit, although this relation may be changed as desired.

By providing the head loose or with some movement between it and the shank, the tendency to break off the shank at a point near the head is reduced to a minimum.

While I have illustrated and described the preferred form of my construction, I do not desire to be limited to the precise details set forth but desire to avail myself of such changes and modifications as come within the appended claim.

I claim:

A rivet set comprising a head having a recess in one side with the side wall of said recess substantially cylindrical, the bottom wall substantially plane and the corners between said side wall and bottom rounded, and a shank having one end disposed in and substantially fitting all of the surfaces of said recess, said end of the shank having a snug sliding fit with said recess.

In testimony whereof I have signed my name to this specification on this 10th day of December, A. D. 1919.

ISAAC J. CUNDIFF.